(12) United States Patent
Yoneoka

(10) Patent No.: US 6,769,849 B2
(45) Date of Patent: Aug. 3, 2004

(54) TWO-PIECE CLIP

(75) Inventor: Akira Yoneoka, Kanagawa (JP)

(73) Assignee: Piolax Inc., Yokohama (JP)

( * ) Notice: Subject to any disclaimer, the term of this patent is extended or adjusted under 35 U.S.C. 154(b) by 0 days.

(21) Appl. No.: 10/430,316

(22) Filed: May 7, 2003

(65) Prior Publication Data

US 2004/0020016 A1 Feb. 5, 2004

(30) Foreign Application Priority Data

Jun. 12, 2002 (JP) .................................... P2002-171011

(51) Int. Cl.[7] .................... F16B 13/06; F16B 19/00
(52) U.S. Cl. ...................... 411/45; 411/41; 411/508
(58) Field of Search .................... 411/41, 45–48, 411/508–510, 913

(56) References Cited

U.S. PATENT DOCUMENTS

| | | | |
|---|---|---|---|
| 3,701,373 A | * 10/1972 | Wronke et al. | 411/182 |
| 4,114,509 A | 9/1978 | Poe | |
| 4,635,326 A | * 1/1987 | Yagi | 24/453 |
| 5,163,795 A | * 11/1992 | Benoit et al. | 411/45 |
| 5,322,402 A | 6/1994 | Inoue | |
| 5,775,860 A | * 7/1998 | Meyer | 411/46 |
| 6,616,479 B1 | * 9/2003 | Jones | 439/567 |

FOREIGN PATENT DOCUMENTS

| | | |
|---|---|---|
| EP | 1 081 394 A2 | 3/2001 |
| GB | 903 146 | 8/1962 |
| JP | 02-097707 | 4/1990 |
| JP | 06-051522 | 7/1994 |

OTHER PUBLICATIONS

European Search Report dated Nov. 10, 2003.

* cited by examiner

Primary Examiner—Flemming Saether
(74) Attorney, Agent, or Firm—McGinn & Gibb, PLLC

(57) ABSTRACT

A two-piece clip includes a grommet and a pin. The grommet includes a plurality of elastic leg portions separately extending from a flange. The pin includes a shaft for radially expanding the elastic leg portions when the shaft is inserted among the elastic leg portions through the center hole. At an intermediate portion of the shaft, a temporarily locking piece and a locking protrusion are formed. Both ends of the temporarily locking portion are coupled with the shaft in a shaft direction to have a bridge-like shape. The temporarily locking piece protrudes in an outer radial direction. The locking protrusion is adjacent to the temporarily locking piece in a shaft tip end direction. An inner peripheral edge of the flange is engaged between the temporarily locking piece and the locking protrusion so that the pin is temporarily locked to the grommet.

4 Claims, 7 Drawing Sheets

TWO-PIECE CLIP

The present disclosure relates to the subject matter contained in Japanese Patent Application No. 2002-171011 filed on Jun. 12, 2002, which is incorporated herein by reference in its entirety.

BACKGROUND OF THE INVENTION

1. Field of the Invention

The present invention relates to a two-piece clip which is configured by a grommet and a pin, and which is used for coupling two panels with each other or the like.

2. Description of the Related Art

Usually, a two-piece clip is configured by: a grommet having elastic leg portions which are formed by dividing into plural parts a portion elongating from an annular flange; and a pin having a shaft which is to be inserted between the elastic leg portions through a center hole of the flange, whereby the elastic leg portions are radially expanded.

Such two-piece clips are widely used in various fields such as fixation of automobile parts. For example, a pair of panels which are to be coupled are overlaid on each other so that their mounting holes coincide with each other, and the pin is previously inserted into the grommet by a degree at which the legs are not opened. Under this state, the legs of the grommet are inserted into the coincident mounting holes to make the flange of the grommet butt against one of the panels. When the pin is pressingly inserted under this state, the legs of the grommet are expanded by the shaft of the pin, and the pair of panels are clamped by the flange of the grommet and the legs to be coupled with each other.

A two-piece clip having such a configuration is proposed in JP-UM-A-6-51522. An engagement pawl which elongates in an inner radial direction and in an axial tip end direction are formed on an inner face of a shaft of a grommet so that a pin and the grommet take one of: a first coupling position where a shaft of the pin is inserted into the grommet shaft, the grommet shaft is not radially expanded by the pin shaft, and a flange of the pin separates from a flange of the grommet; a second coupling position where the pin shaft is inserted into the grommet shaft, the grommet shaft is radially expanded by the pin shaft, and the pin flange is in contact with the grommet flange; and a third coupling position where the pin shaft is pulled in the grommet shaft from the second coupling position under a state where the pin shaft is inserted into the grommet shaft but the pin flange separates from the grommet flange. Engagement grooves which are to receive the engagement pawl are formed in the pin shaft. The engagement groove which is to be engaged at the third coupling position with the engagement pawl is formed into a shape in which the tip end of the engagement pawl is restricted to the engagement groove so that the pin shaft is not further pulled out from the grommet shaft. The engagement pawl of the grommet shaft which is to be engaged at the third coupling position with the engagement groove is disposed at any level that is between a face of a to-be-mounted member through which the grommet shaft is passed, and the grommet flange.

In a conventional two-piece clip, under the state where a pin is inserted halfway into a grommet and legs of the grommet are not radially expanded, the pin and the grommet are usually inserted into mounting holes of to-be-mounted members while the heads of the pin and the grommet are nipped. However, it is difficult to nip the pin and the grommet by fingers because the length between a flange of the grommet and the head of the pin is short, thereby causing a problem in that the work of inserting the clip into mounting holes is hardly conducted. In the case where the hole of the front to-be-mounted member is positionally shifted from that of the rear to-be-mounted member, particularly, it is required to search the holes by changing the direction of the legs of the grommet while nipping the heads of the pin and the grommet. When it is difficult to nip the heads of the pin and the grommet, the workability of the mounting work tends to be extremely impaired.

By contrast, in the two-piece clip disclosed in JP-UM-A-6-51522, the head of the pin largely protrudes from the grommet under the state where the clip is temporarily assembled in the first coupling position. Therefore, the clip has an advantage that the head of the pin can be easily nipped when the clip is to be inserted into the mounting holes of the to-be-mounted members.

In the above two-piece clip, when, after the to-be-mounted members are coupled with each other by pressing the head of the pin, the to-be-mounted members must be uncoupled for any reason, the engagement between the legs of the grommet and the shaft of the pin is cancelled, the shaft of the pin is pulled out to radially contract the legs of the grommet, and under this state the legs of the grommet is pulled out from the mounting holes. In this case, there arises a problem in that the engagement pawl of the shaft of the grommet is broken and hence temporary locking at the first coupling position cannot be conducted when the pin is to be reused.

SUMMARY OF THE INVENTION

It is an object of the invention to provide a two-piece clip in which temporary locking can be conducted under the state where the head of a pin largely protrudes from a grommet, and in which, after the pin is pressingly inserted into the grommet to be coupled therewith, the pin can be pulled out to cancel the coupling, and the temporary locked state can be again set so that the clip can be reused.

A two-piece clip according to a first aspect of the invention includes a grommet and a pin. The grommet includes an annular flange defining a center hole and a plurality of elastic leg portions separately extending from the flange. The pin includes a shaft, a temporarily locking piece, and a locking protrusion. The shaft radially expands the elastic leg portions when the shaft is inserted among the elastic leg portions through the center hole. The temporarily locking piece extends from the shaft to protrude in an outer radial direction. The locking protrusion is formed on the shaft to be adjacent to the temporarily locking piece in a shaft tip end direction. The shaft and the temporarily locking piece define an opening therebetween so that the temporarily locking piece has a bridge shape. In a process of inserting the pin into the grommet, an inner peripheral edge of the flange is engaged between the temporarily locking piece and the locking protrusion in a state where the leg portions are not radially expanded, and the pin is temporarily locked to the grommet.

According to the invention, under the state where the pin is in mid-course of press insertion of the pin between the elastic leg portions and the legs are not radially expanded, the inner peripheral edge of the flange is engaged between the temporarily locking piece and the locking protrusion, and the pin is temporarily locked to the grommet. Therefore, the temporary locking can be conducted under the state where the head of the pin largely protrudes from the grommet, and the head of the pin can be easily nipped by fingers. In a case such as that where the front and rear to-be-mounted members are positionally shifted from each other and it is required to search a mounting hole of a rear to-be-mounted member after the clip is inserted into a mounting hole of a front to-be-mounted member, consequently, the work can be easily conducted.

When the to-be-mounted members are to be uncoupled after the to-be-mounted members are coupled with each other by pressing the pin to radially expand the legs of the grommet, the pin must be pulled out from the grommet to radially contract the legs. In this case, the axial ends of the temporarily locking piece are connected to the shaft of the pin so that the temporarily locking piece is formed into a bridge-like shape, and hence the temporarily locking piece is prevented from being broken. When the clip is to be reused, therefore, the pin is pulled back halfway from the grommet to cause the inner peripheral edge of the flange to be engaged between the temporarily locking piece and the locking protrusion, thereby enabling the pin to be again temporarily locked to the grommet.

Since the temporarily locking piece has a bridge-like shape as described above, the temporarily locking piece exhibits high elasticity against an external force in a radial direction. Therefore, the insertion resistance which is produced when the pin is pressed to couple to-be-mounted members can be reduced to a relatively small value, so that the work of pressing the pin is not hindered.

In addition to the first aspect of the invention, in a second aspect of the invention, a protrusion height of the locking protrusion is higher than that of the temporarily locking piece. The temporarily locking piece is more easily elastically deformed than the locking protrusion.

According to the invention, when the pin tries to slip off from the grommet under the state where the pin is inserted halfway into the grommet to be temporarily locked, the locking protrusion is firmly engaged with the inner peripheral edge of the grommet. Therefore, the pin is prevented from slipping off.

In addition to the first or second aspect of the invention, in a third aspect of the invention, the temporarily locking piece is two temporarily locking pieces. The temporarily locking pieces are formed at two positions, which are opposed to each other in a circumferential direction of the shaft.

According to the invention, molds for injection molding the bridge-like temporarily locking piece can be easily produced, and the pin can be stably held to the grommet by performing the temporarily locking at two places opposed in the circumferential direction.

DETAILED DESCRIPTION OF THE PREFERRED EMBODIMENTS

Hereinafter, an embodiment of the invention will be described with reference to FIGS. 1 to 7.

Figure 1:
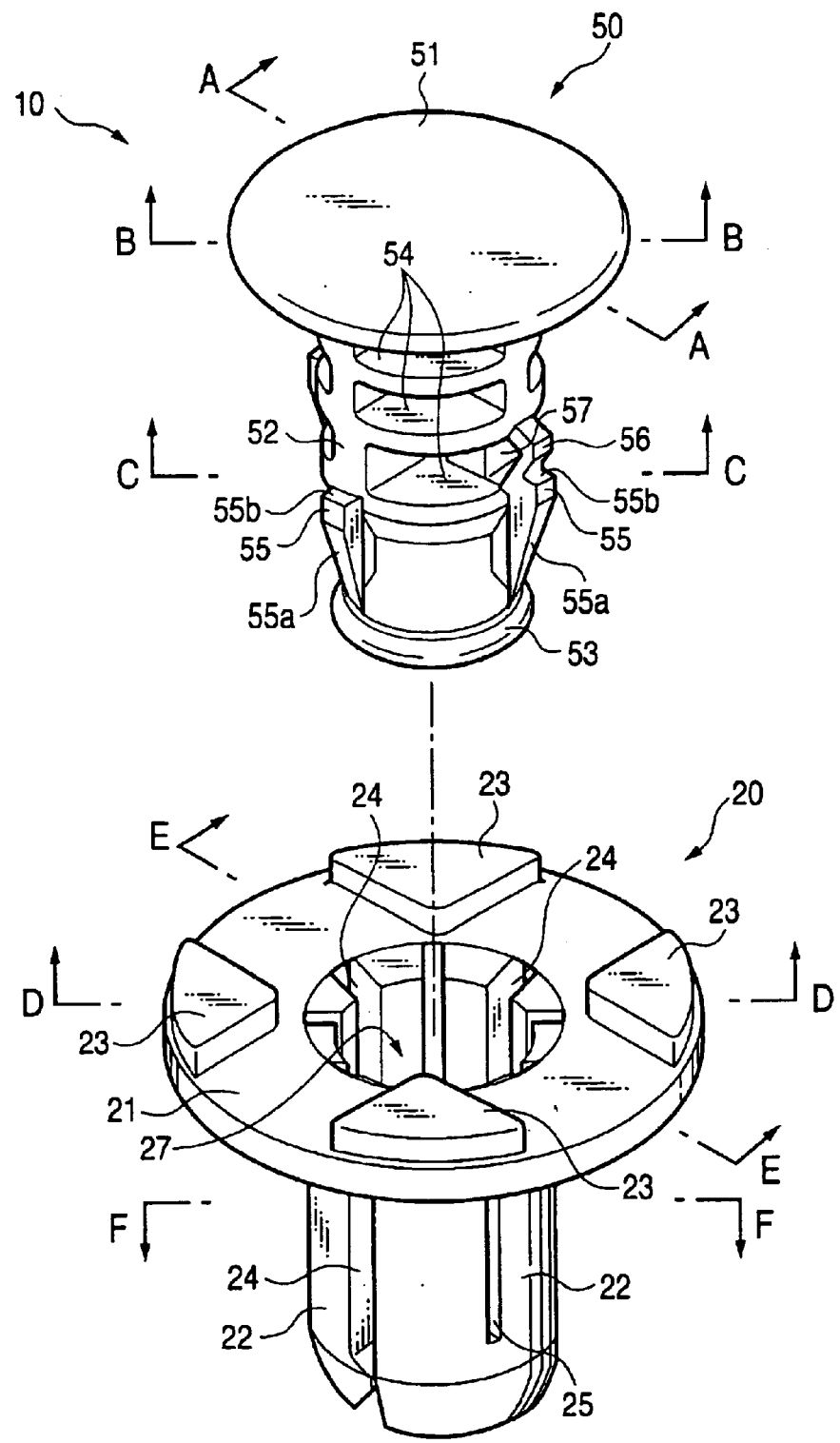
FIG. 1 is an exploded perspective view showing an embodiment of the two-piece clip of the invention.

As shown in FIG. 1, a two-piece clip 10 includes a grommet 20 and a pin 50.

Figure 3D:
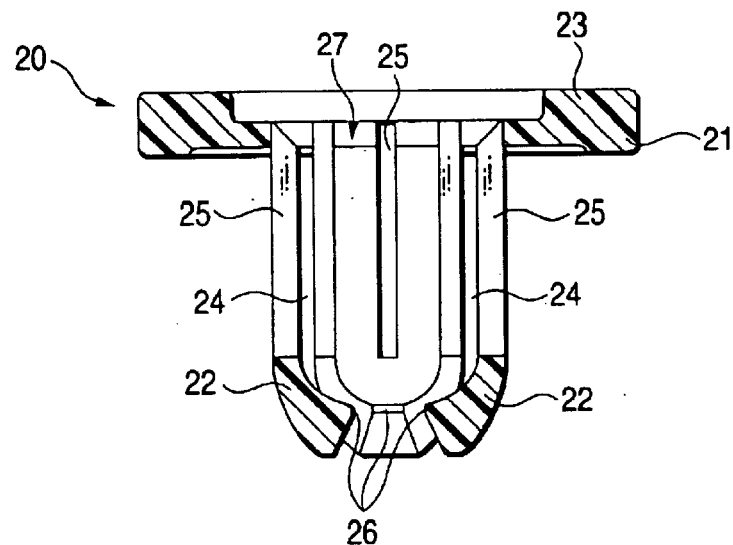
FIG. 3D is a section view showing a grommet used in the two-piece clip, and looking in the direction of the arrows D—D of FIG. 1.
Figure 3E:
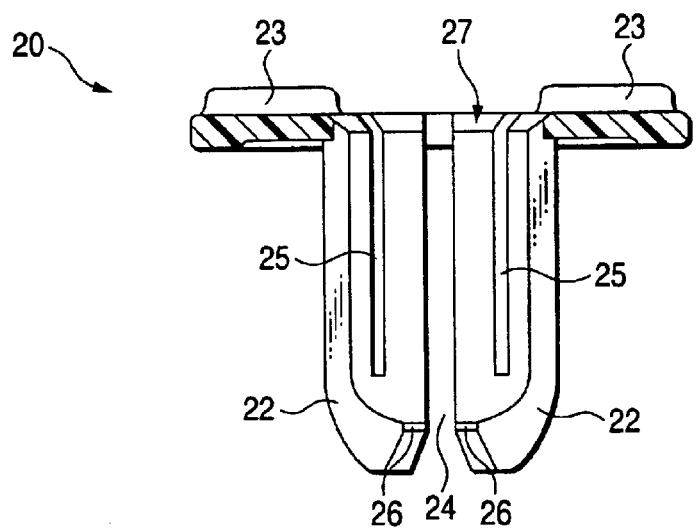
FIG. 3E is a section view looking in the direction of the arrows E—E of FIG. 1.
Figure 3F:
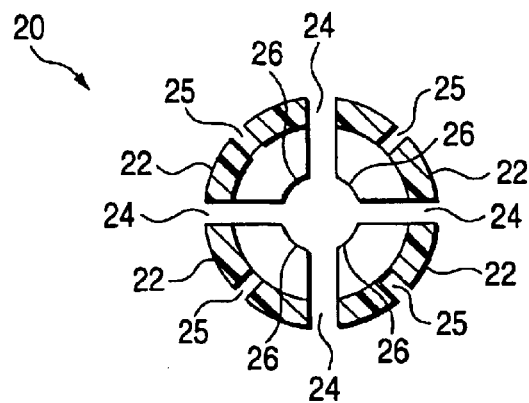
FIG. 3F is a section view looking in the direction of the arrows F—F of FIG. 1.

Referring also to FIG. 3, the grommet 20 includes an annular flange 21 and four elastic leg portions 22. The annular flange 21 defines a hole 27 at the center thereof. The elastic leg portions 22 elongate substantially perpendicularly from an inner peripheral edge of one face of the flange 21.

In the flange 21, four protrusions 23, which are arranged in the circumferential direction, are formed on a face, which is on a side of insertion of the pin 50. Gaps into which a tip end of a flat-head screwdriver or the like when a head 51 of the pin 50 abuts against the protrusions 23, can be inserted are formed between the protrusions 23.

The elastic leg portions 22a rear ranged with being shifted from each other by 90 degrees. Slit-like gaps 24 are formed between the elastic leg portions 22. An axial slit 25 is formed at the center of each of the elastic leg portions 22. Each of slits 25 enhances the flexibility of each of the elastic leg portions 22.

The outer sides of tip end portions of the elastic leg portions 22 are radially contracted to be formed into a tapered shape, so that the leg portions 22 can be easily inserted into mounting holes, which will be described later. The tip end portions 26 of the elastic leg portions 22 inwardly protrude to become close to each other. Each tip end portion has a wedge-like shape as viewed from the side thereof, and a small arc shape as viewed from the top thereof.

Figure 2A:
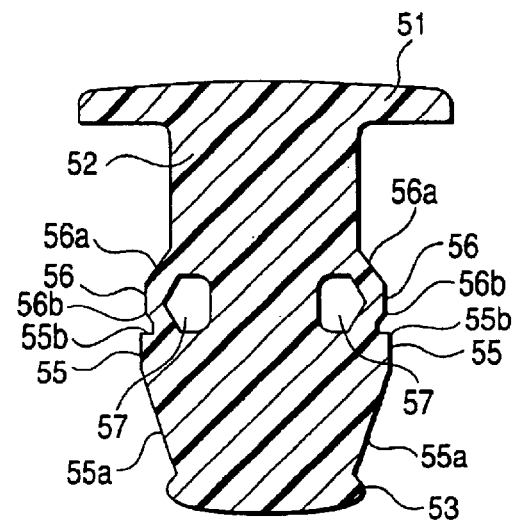
FIG. 2A is a section view showing a pin used in the two-piece clip, and looking in the direction of the arrows A—A of FIG. 1.
Figure 2B:
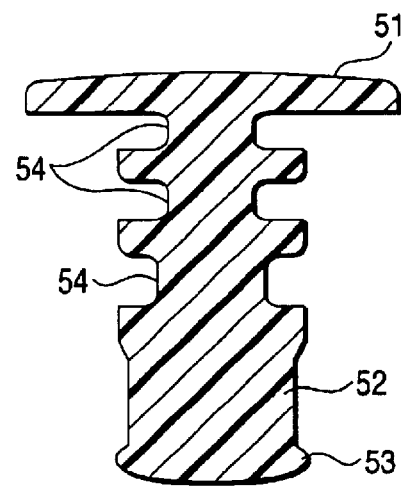
FIG. 2B is a section view looking in the direction of the arrows B—B of FIG. 1.
Figure 2C:
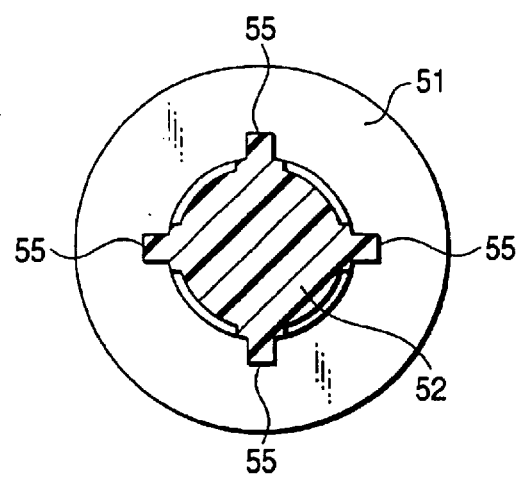
FIG. 2C is a section view looking in the direction of the arrows C—C of FIG. 1.

Referring also to FIG. 2, the pin 50 has a disk-like head 51 and a shaft 52, which elongates substantially perpendicularly from a center portion of one face of the head 51. An annular protrusion 53 is formed on a tip end of the shaft 52. Lightening holes 54 are formed in intermediate portions of the shaft 52. The lightening holes 54 are formed in order to reduce the weight of the product, and are not particularly necessary.

Locking protrusions 55, which are to be inserted respectively into the gaps 24 between the elastic leg portions 22 of the grommet 20, are formed on the shaft 52. In each of the locking protrusions 55, a portion on a side of the tip end of the shaft 52 is formed as a gently inclined face 55a, and a portion on a side of the head 51 is formed as a steeply inclined face 55b (in the embodiment, a face which is substantially perpendicular to the shaft 52). The outer diameter of the locking protrusions 55 is slightly larger than the inner diameter of the hole 27 of the flange 21.

Temporarily locking pieces 56 are formed on the head portion 51 side of the two locking protrusions 55, which are opposite to each other in the circumferential direction. Both ends of each of temporarily locking pieces 56 in the shaft direction are coupled with the shaft 52 to form a bridge-like shape. The temporarily locking pieces 56 protrude in the outer radial direction. Since the temporarily locking pieces 56 are coupled with the shaft 52 in the bridge-like shape and have holes 57 in an inner side thereof, the temporarily locking pieces are so high in elasticity and durability that the temporarily locking pieces 56 are not broken even when the temporarily locking pieces 56 are repeatedly bent. The temporarily locking pieces 56 are formed respectively at the two positions of the shaft 52 of the pin 50, which are opposed to each other in the circumferential direction. Therefore, the design (the arrangement of trimming die) of molds can be easily performed, and the pin 50 can be temporarily locked to the grommet 20 in a well-balanced manner.

In the embodiment, each of the temporarily locking pieces 56 has a V-like shape as viewed from the side. An inclined face 56a on the side of the head 51 and an inclined face 56b on the side of the tip end of the shaft 52 are formed at a substantially same angle. Alternatively, the angle of the inclined face 56a maybe steeper than that of the inclined face 56b, and vice versa. When the angle of the inclined face 56a is steeper than that of the inclined face 56b, the angle of the inclined face 56b is gentle. Therefore, the insertion resistance, which is produced when the pin 50 is pressingly inserted, can be reduced. When the angle of the inclined face 56b is steeper than that of the inclined face 56a, the pin 50 can be easily stopped at a temporarily locked position during a process of mechanically inserting the pin 50 into the grommet to set the pin 50 in a temporary locked state.

A distance between the outer sides of the temporarily locking pieces 56, which are opposed to each other in the circumferential direction, i.e., the outer diameter in a direction of a line connecting the pair of temporarily locking pieces 56 is slightly larger than the inner diameter of the hole 27 of the grommet 20. The locking protrusions 55 are higher in protrusion height in the outer radial direction than the temporarily locking pieces 56.

Next, the function of the two-piece clip will be described.

Figure 4:
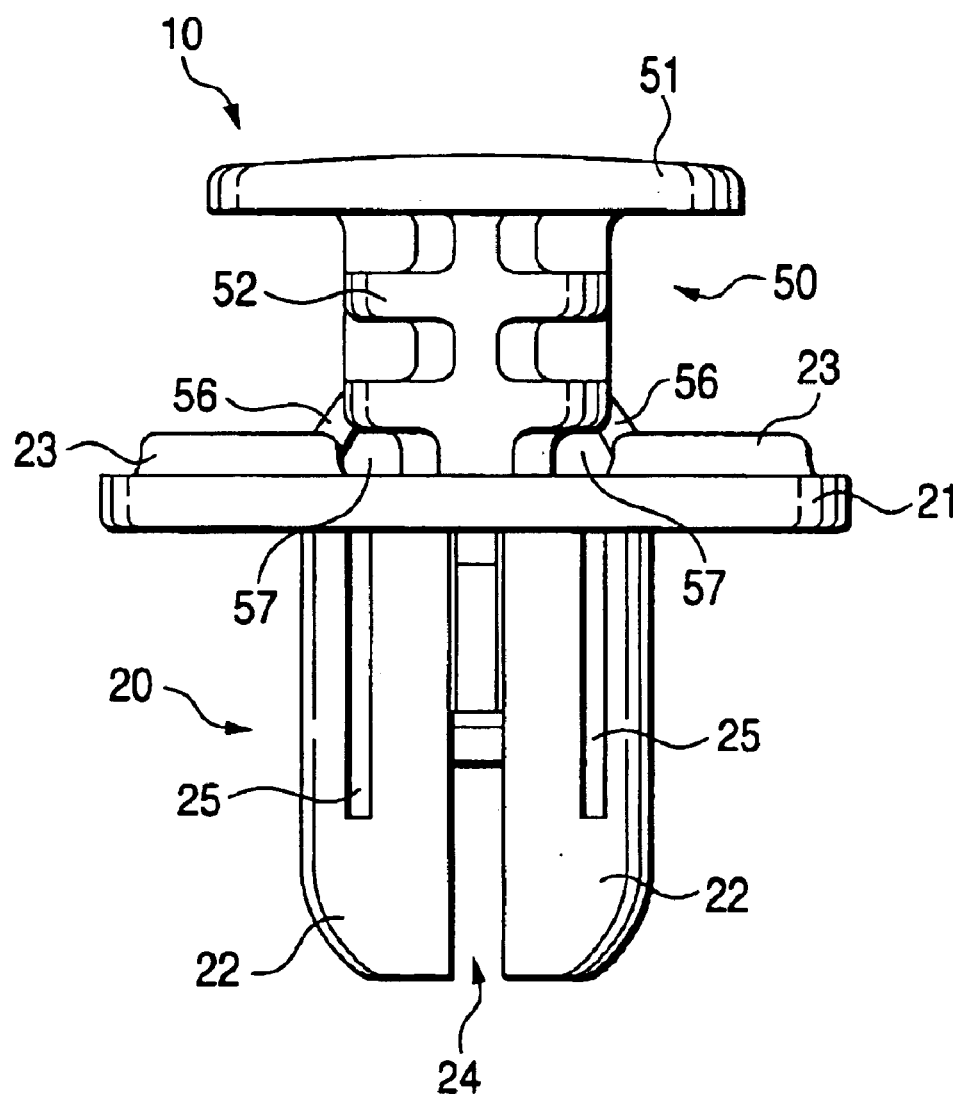
FIG. 4 is a side view showing a state where the two-piece clip is temporarily held.
Figure 6:
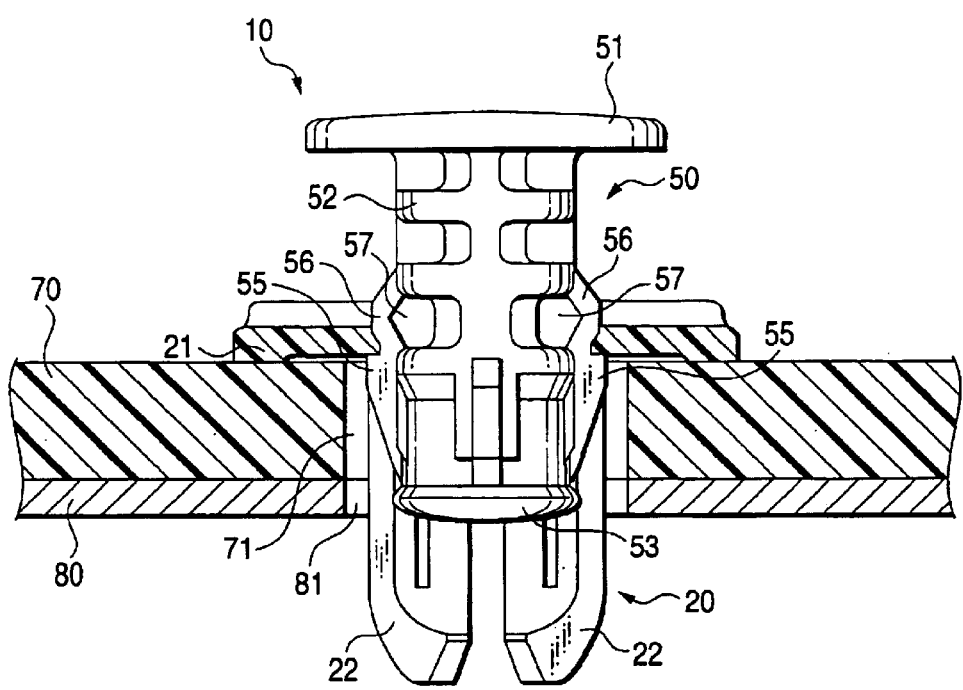
FIG. 6 is a section view showing a state where the two-piece clip in the temporarily held state is inserted into the mounting holes of the to-be-mounted members.

As shown in FIGS. 4 and 6, when the pin 50 is inserted halfway into the grommet 20 and the locking protrusions 55 are pressingly passed through the hole 27 of the flange 21, the protrusions 55 are temporarily locked in the gaps 24 by a lower face edge of the flange 21. The inner peripheral edge of the flange 21 of the grommet 20 is sandwiched between the temporarily locking pieces 56 and the locking protrusions 55, so that the pin 50 can be temporarily locked to the grommet 20. At this time, the tip end of the shaft 52 of the pin 50 has not yet reached to a position where the shaft 52 expands the elastic leg portions 22 of the grommet 20, and the elastic leg portions 22 are in the radially contracted state.

Figure 5:
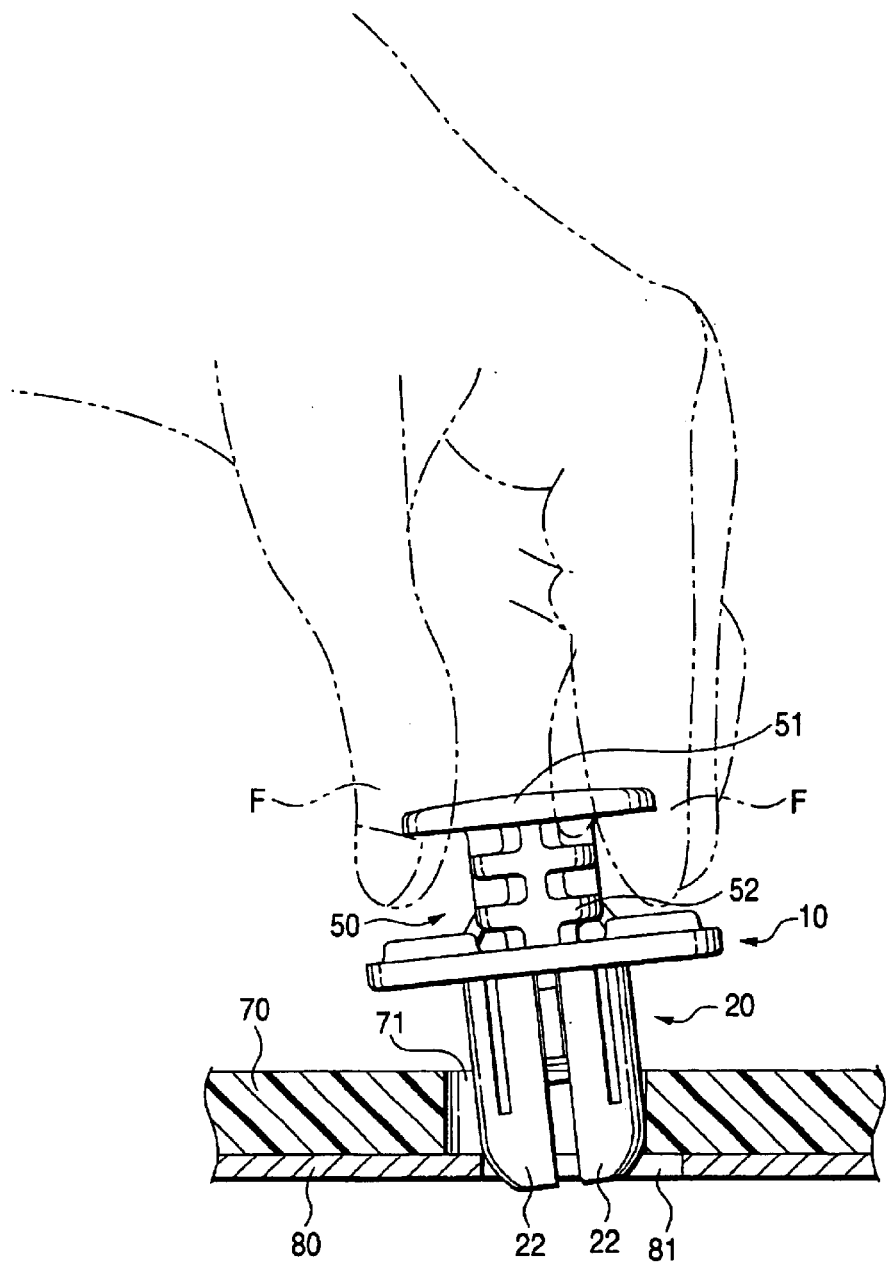
FIG. 5 is a diagram showing a state where the two-piece clip is nipped by fingers and inserted into mounting holes of to-be-mounted members.

As shown in FIG. 5, the head 51 of the pin 50 in the temporarily held state is then held by fingers F, and the tip ends of the elastic leg portions 22 of the grommet 20 are inserted into mounting holes 71 and 81 of paired panels 70 and 80. The panels 70 and 80 often fail to correctly coincide with each other so that the mounting holes 71 and 81 are positionally shifted from each other. In such a case, it is required to insert the grommet 20 of the pin 50 into the mounting hole 71 of the front panel 70 and then search the mounting hole 81 of the rear panel 80 while moving the tip end of the grommet 20.

By contrast, in the clip 10, the head 51 of the pin 50 in the temporarily held state protrudes by a relatively large length from the flange 21 of the grommet 20, and hence the head can be easily held by the fingers F, so that the above-mentioned work can be easily conducted. Since the outer diameter of the locking protrusions 55 is slightly larger than the inner diameter of the flange 21, the locking protrusions 55 are caused by the steep inclined face 55b on the side of the head 51 to be more firmly engaged with the inner peripheral edge of the flange 21. Therefore, it is not caused that the pin 50 is completely pulled out from the grommet 20 during the work.

In this way, the flange 21 of the grommet 20 abuts against the front panel 70, and the clip 10 is set to the state shown in FIG. 6. Under this state, the head 51 of the pin 50 is pressed to pressingly insert the shaft 52 of the pin 50 between the elastic leg portions 22 of the grommet 20. At this time, the temporarily locking pieces 56 formed on the shaft 52 of the pin 50 are passed through the center hole 27 of the flange 21 while being inwardly bent.

Figure 7:
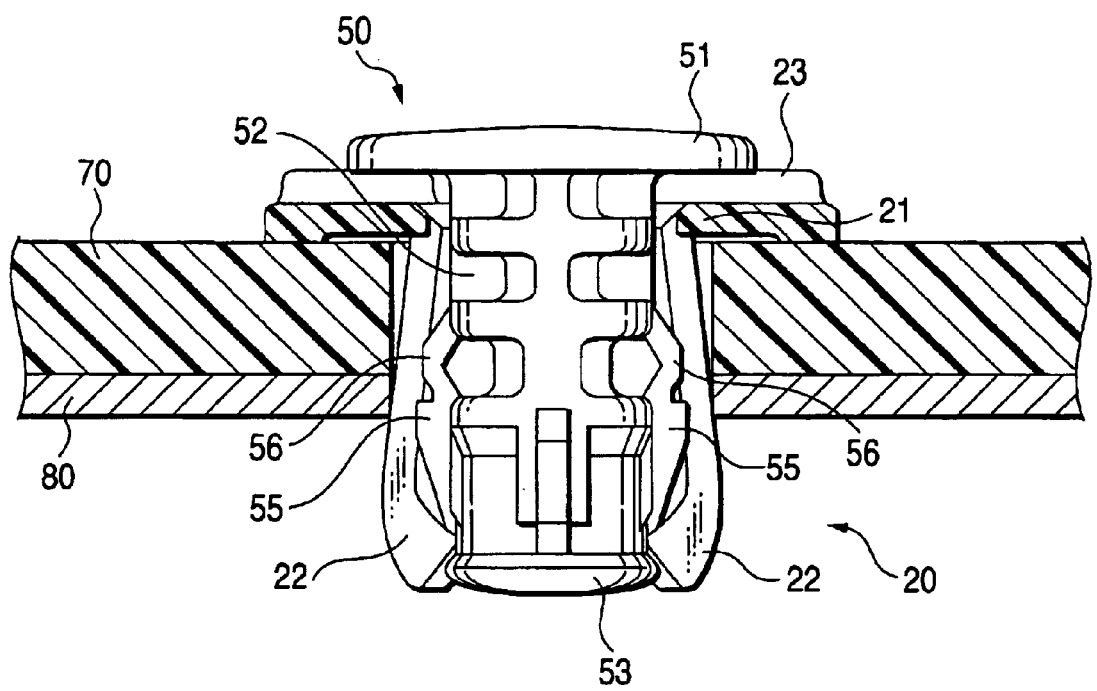
FIG. 7 is a section view showing a state where the pin of the two-piece clip is pressingly inserted and the to-be-mounted members are coupled with each other.

As shown in FIG. 7, thereafter, the annular protrusion 53 at the tip end of the shaft 52 is downward lowered while pressingly expanding the tip end portions 26 of the elastic leg portions 22. The tip end portions 26 are engaged with the annular protrusion 53 to hold the elastic leg portions 22 in the state where the leg portions 22 are radially expanded. As a result, the flange 21 of the grommet 20 is engaged with the panel 70, and the elastic leg portions 22 of the grommet 20 are engaged with the panel 80. Therefore, the pair of panels 70 and 80 are sandwiched between the flange 21 and the leg portions 22 to be fixed.

When the panels 70 and 80 are to be again separated from each other, the engagement of the clip 10 can be cancelled in the following manner. Since the gaps with respect to the head 51 are formed between the protrusions 23 of the flange 21 as shown in FIG. 1, the tip end of a flat-head screwdriver is inserted into one of the gaps and the head 51 is then pried open by the principle of the leverage. Thereby, the pin 50 can be compulsively pulled out.

At this time, the temporarily locking pieces 56 can be flexibly bent to be passed through the hole 27 of the flange 21 without being broken, because the temporarily locking pieces are coupled with the shaft 52 in the bridge-like shape as described above. The inner periphery of the flange 21 is again engaged between the temporarily locking pieces 56 and the locking protrusions 55 so that the temporarily held state is formed. Therefore, the clip can be again set to the state of FIGS. 4 and 5 so as to be used in coupling of the panels 70 and 80.

As described above, according to the invention, when the pin is inserted halfway into the grommet to set the temporarily held state, the head of the pin largely protrudes from the flange of the grommet, and hence can be easily nipped by fingers. When, after the to-be-mounted members are coupled by pressingly inserting the pin to radially expand the legs of the grommet, the pin is to be pulled out from the grommet to cancel the coupling, the temporarily locking piece is not broken because the temporarily locking piece is connected at the axial ends to the shaft of the pin to be formed into a bridge-like shape and exhibits high elasticity. When the clip is to be reused, therefore, the pin is pressingly inserted halfway into the grommet so that the temporarily locked state can be again formed. Since the temporarily locking piece has a bridge-like shape as described above, the temporarily locking piece exhibits high elasticity against an external force in a radial direction. Therefore, the insertion resistance which is produced when the pin is pressed to couple to-be-mounted members can be reduced to a relatively small value, so that the work of pressing the pin can be easily conducted.

What is claimed is:

1. A two-piece clip comprising:

a grommet; and a pin, wherein:

the grommet includes:

an annular flange defining a center hole; and a plurality of elastic leg portions separately extending from the flange;

the pin includes:

a shaft for radially expanding the elastic leg portions when the shaft is inserted among the elastic leg portions through the center hole;

a temporarily locking piece extending from the shaft to protrude in an outer radial direction; and a locking protrusion formed on the shaft to be adjacent to the temporarily locking piece in a shaft tip end direction; and the shaft and the temporarily locking piece define an opening therebetween so that the temporarily locking piece has a bridge shape;

in a process of inserting the pin into the grommet, an inner peripheral edge of the flange is engaged between the temporarily locking piece and the locking protrusion in a state where the leg portions are not radially expanded, and the pin is temporarily locked to the grommet.

2. The two-piece clip according to claim 1, wherein:

a protrusion height of the locking protrusion is higher than that of the temporarily locking piece; and the temporarily locking piece is more easily elastically deformed than the locking protrusion.

3. The two-piece clip according to claim 2, wherein:

the temporarily locking piece is two temporarily locking pieces; and the temporarily locking pieces are formed at two positions, which are opposed to each other in a circumferential direction of the shaft.

4. The two-piece clip according to claim 1, wherein:

the temporarily locking piece is two temporarily locking pieces; and the temporarily locking pieces are formed at two positions, which are opposed to each other in a circumferential direction of the shaft.

\* \* \* \* \*